(12) United States Patent
Kohler et al.

(10) Patent No.: US 6,450,281 B1
(45) Date of Patent: *Sep. 17, 2002

(54) CONTROL SYSTEM FOR A VEHICLE

(75) Inventors: Rolf Kohler, Schwieberdingen; Johannes Schmitt, Markgroeningen; Guenter Braun, Bietigheim; Matthias Kottmann, Wendlingen, all of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/535,139

(22) Filed: Mar. 24, 2000

(30) Foreign Application Priority Data

Mar. 26, 1999 (DE) .......................... 199 13 825

(51) Int. Cl.⁷ .............................................. B60K 41/00
(52) U.S. Cl. ............................ 180/197; 701/82; 701/74
(58) Field of Search ............................ 180/197; 701/82, 701/83, 84, 85, 86, 70, 74; 303/139, 141

(56) References Cited

U.S. PATENT DOCUMENTS

| | | | | |
|---|---|---|---|---|
| 4,849,891 A | * | 7/1989 | Krohn et al. ............ | 364/426.03 |
| 4,939,656 A | * | 7/1990 | Hoashi et al. ........... | 364/426.02 |
| 5,019,989 A | * | 5/1991 | Ueda et al. ............. | 364/431.05 |
| 5,431,242 A | * | 7/1995 | Iwata et al. ............ | 180/197 |
| 5,442,918 A | * | 8/1995 | Baeuerle et al. ........ | 60/602 |
| 5,463,551 A | * | 10/1995 | Milunas .................. | 364/426.02 |
| 5,519,617 A | * | 5/1996 | Hughes et al. .......... | 364/426.03 |
| 5,682,316 A | * | 10/1997 | Hrovat et al. .......... | 364/426.029 |
| 5,713,332 A | * | 2/1998 | Adler et al. ............ | 123/417 |
| 5,737,714 A | * | 4/1998 | Matsuno et al. ........ | 701/89 |
| 6,029,107 A | * | 2/2000 | Sato ..................... | 701/58 |
| 6,199,650 B1 | * | 3/2001 | Masberg et al. ........ | 180/197 |
| 6,208,929 B1 | * | 3/2001 | Matsuno et al. ........ | 701/89 |
| 6,219,609 B1 | * | 4/2001 | Matsuno et al. ........ | 701/72 |
| 6,240,355 B1 | * | 5/2001 | Schmitt ................. | 701/84 |
| 6,266,601 B1 | * | 7/2001 | Soga et al. ............ | 701/74 |
| 6,278,929 B1 | * | 8/2001 | Tozu et al. ............ | 701/70 |

FOREIGN PATENT DOCUMENTS

EP 0 386 126 9/1990

OTHER PUBLICATIONS

SAE Paper 950759, "VDC, The Vehicle Dynamics Control System of Bosch" by Anton T. van Zanten, Rainer Erhardt and George Pfaff.

* cited by examiner

Primary Examiner—Avraham Lerner
Assistant Examiner—Daniel Yeagley
(74) Attorney, Agent, or Firm—Kenyon & Kenyon

(57) ABSTRACT

A control system, for use in a vehicle, that influences at least one quantity representing tire slip, and which includes a control unit for controlling at least the drive unit of the vehicle. A traction controller for influencing the engine torque may be implemented in the control unit, and may be used to generate a value for a regulated quantity (or manipulated variable) for the torque of the drive unit based on at least a characteristic map that depends on the slippage and on the slip gradient.

17 Claims, 6 Drawing Sheets

CONTROL SYSTEM FOR A VEHICLE

FIELD OF THE INVENTION

The present invention relates to a control system for a vehicle, which influences at least one quantity representing tire slip.

BACKGROUND INFORMATION

A vehicle dynamics control system is discussed in SAE paper 950759, which is entitled "VDC, The Vehicle Dynamics Control System of Bosch" by Anton T. van Zanten, Rainer Erhardt and Georg Pfaff. The control system includes an anti-lock controller, a traction controller, an engine drag torque controller, and a controller that operates based on a quantity representing the yaw rate of the vehicle. These control systems are implemented in a control unit, which influences the braking system of the vehicle, and which, via a communication connection, is connected to a control unit for controlling a drive unit, such as the engine and/or the transmission. This control system may include relatively complex software and hardware because of, for example, computer performance requirements, the required transmission rate requirements between control systems or other considerations.

European Patent No. EP 0 386 126 concerns a traction controller, in which a slippage of at least one drive wheel is detected and an engine torque is reduced based on the slippage, particularly when the slippage exceeds a preset threshold value. When the slippage is adjusted to such a preset value or range, the engine torque is slowly increased (or ramped up) by controlling correspondingly the throttle valve according to a predefined procedure. This reference, however, does not describe a procedure for determining the magnitude of the reduction of the engine torque if there is unacceptable slippage.

Non-prepublished German Patent Application No. 198 44 912.7 concerns a control system for a vehicle, in which a transverse acceleration acting upon the vehicle is detected, and a time response of the transverse acceleration is determined. The power output or the torque of the vehicle's drive unit is influenced based on these two quantities. In the case of the drive unit, this procedure should ensure a stable vehicle behavior, particularly when cornering.

SUMMARY OF THE INVENTION

An object of an exemplary embodiment of the present invention is to provide a control system that influences a drive unit of the vehicle at least for controlling a slip quantity, but which has a reduced degree of complexity in its software and hardware and still provides satisfactory control response.

Another object of an exemplary embodiment of the present invention is to provide an implementation of an effective, relatively simple traction controller in a control unit that influences the torque of the vehicle's drive unit. Such an implementation should simplify the software and hardware requirements (such as, the ROM requirement). It is believed that it may be particularly advantageous to combine this traction controller with the transverse acceleration control system discussed in the Background Information, and provide a drive dynamics control system which, in the case of the drive input, improves vehicle stability. By implementing this simpler, reduced outlay system in the control unit for the drive unit of the vehicle, a marked reduction of the outlay of software and hardware should be achieved without having to expect losses with respect to the vehicle's driving stability and/or the traction of the vehicle.

It is also believed that it may be particularly advantageous to provide the traction control system with characteristic curves or maps so that setpoint values may be derived for at least one manipulated (or regulated) variable (or quantity) that controls the power output or the torque of the drive unit, such as, for example, as a function of the tire slip and/or the timerelated change in the tire slip, as well as a quantity representing the vehicular velocity. By using this relatively simple traction control system, which should reduce the outlay for the control unit, satisfactory traction control improvements may be achieved.

It is also believed that it may be particularly advantageous that the gradient (or rate of change), which is used to approximate the manipulated (or regulated) variable (or quantity) to the value corresponding to the operating state, may be weighted via the number of control cycles or via the magnitude of the slippage. It may be particularly expedient to consider slippage and slip gradient in determining the gradient. In this manner, the rapidness of approximation becomes dependent on the slip condition.

When selecting a throttle valve setpoint angle as a manipulated variable, the selected setpoint or limiting angle may be expediently corrected so that tractive resistances, such as grades (for example, uphill) and/or low engine power output at higher altitude above sea level, are taken into account, and the adjusted limiting angle permits the torque or the power output of the drive unit, even "outside" of standard conditions, along the lines or in the sense of a slip reduction or of adjusting a slip control valve to a desired value.

It is also believed that it may be particularly advantageous that, during unusual operating states in which a permanent deviation occurs (such as, for example, permanent deviation of the slippage from the preset value or range of values), the deviation may be integrated, and the value that is ascertained or determined from the characteristic map or maps for the manipulated variable may be influenced as a function of the integration value so that the permanent deviation disappears. Thus, a satisfactory traction may result in exceptional situations.

DETAILED DESCRIPTION

Figure 1:
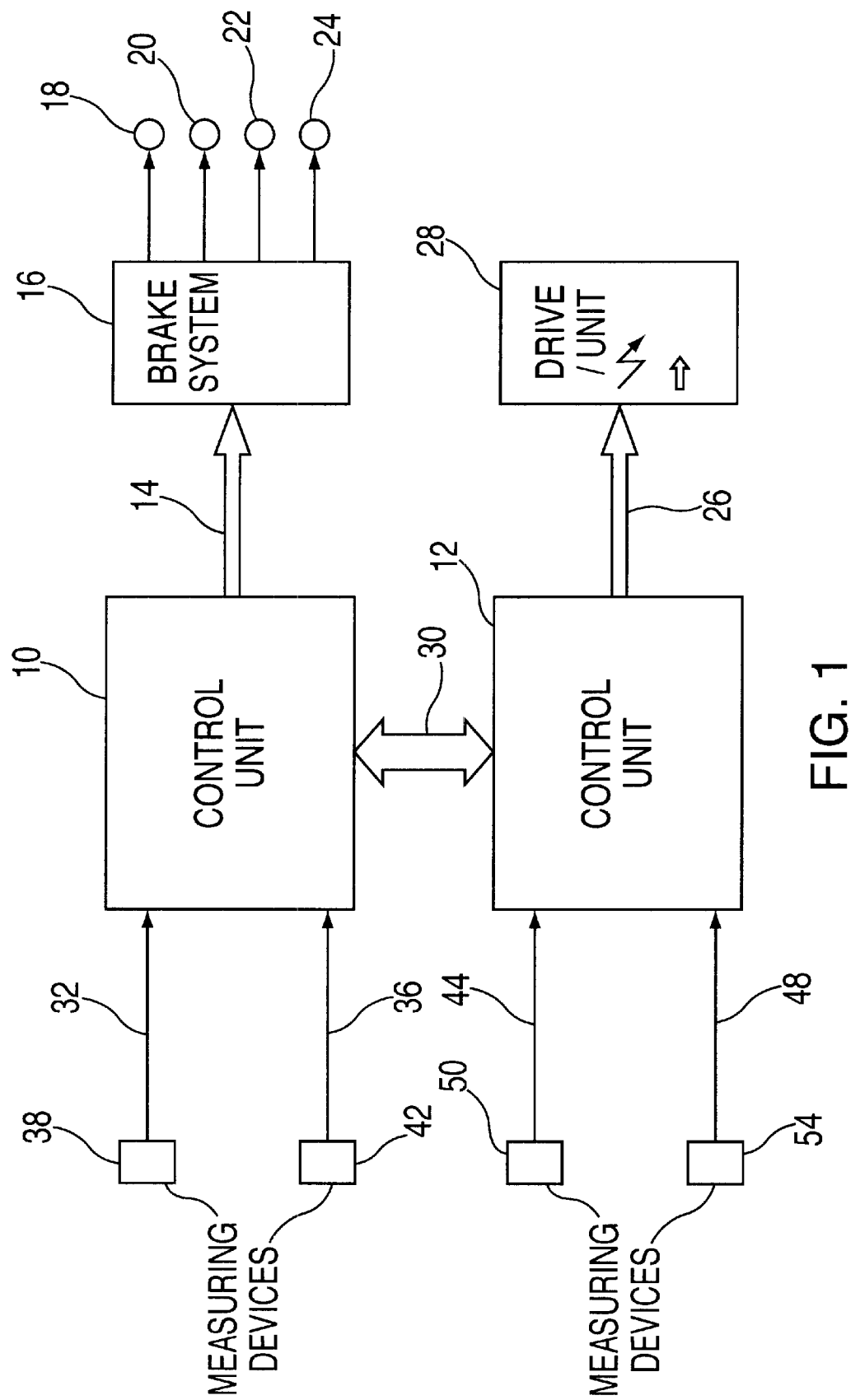
FIG. 1 shows a block diagram of control units for controlling the drive unit and the braking system of a vehicle, in which the control system may be implemented in the control units.

FIG. 1 shows a block diagram of a vehicle control system, in which at least two separate control units 10 and 12 are provided. The control unit 10, via its output lines 14, operates a braking system 16, which may be a hydraulic braking system that builds up or reduces the braking force at the wheel brakes 18 through 24 of the vehicle. The control unit 12, via its output lines 26, controls at least one manipulatable variable (or regulatable quantity) that influences the torque or the power output of a drive unit 28 of the vehicle. As used in connection with an exemplary embodiment, the drive unit 28 is an internal combustion engine, in which the position of a throttle valve, a fuel mass to be injected and/or an ignition-advance angle to be adjusted are available for adjusting the power output. The control of a turbocharger, which changes the boost pressure in the intake section of the internal combustion engine, a camshaft, and/or the intake valves of an internal combustion engine, represents such a manipulated variable. In an exemplary embodiment, the control unit 12 controls the drive unit 28 and an automatic transmission. In this exemplary embodiment, one of the available manipulated variables is also a transmission intervention (action or measure) variable (or quantity), the transmission ratio of the transmission being changed by the transmission intervention variable. Correspondingly, provision can be made for a clutch capable of being actuated electrically, whose manipulated variable (or regulated quantity) is available as a control variable within the framework of the traction control system.

While the method and system of FIG. 1 are discussed with respect to a hydraulic braking system and a drive unit that is an internal combustion engine, the method and system are not so limited. The corresponding method or procedure may be employed with the same advantages when the drive unit is an electromotor or a hybrid propulsion system, and the braking system is a pneumatic braking system or an electromotive braking system.

Control units 10 and 12 are interconnected for data exchange via a communication system 30, which may be, for example, a controller are a network (CAN). Control unit 10, which contains at least one microcomputer, detects signals via input lines 32 through 36 from corresponding measuring devices 38 through 42. The signals represent the speeds of the wheels of the vehicle. Control unit 10 also detects signals that represent other performance quantities required for performing its function, which are not supplied by the other control unit 12 via communication connection 30. The at least one microcomputer of control unit 10 controls the brakes. In the exemplary embodiment, the control unit 10 performs an anti-lock function. In other exemplary embodiments, a drive dynamics control system may be implemented that intervenes in the braking system of the vehicle. Such systems may be known from the related art. The control unit 10 sends measured values to the control unit 12 via communication connection 30. The measured values are derived from the input signals in the control unit 10. Signals transmitted via communication connection 30 may include, for example, a signal that represents the vehicular velocity (which may be determined based on the wheel speed values), as well as the wheel speed values.

The control unit 12 likewise contains at least one microcomputer controlling the drive unit 28 and/or the transmission of the motor vehicle. The control unit 12 also receives signals via input lines 44 through 48 from corresponding measuring devices 50 through 54. These signals represent performance quantities for controlling the drive unit 28 and/or the transmission, or may be used to derive performance quantities of that kind.

Besides the control measures for controlling the drive unit and/or the transmission, the control unit 12, in the exemplary embodiment, may include the drive dynamics control system mentioned previously, which, based on the transverse acceleration measured by measuring devices 50 through 54 and the gradient of the transverse acceleration, ascertains an intervention signal in at least one manipulated variable for controlling the power output or the torque of the drive unit 28. The traction control method may be implemented using the microcomputer of control unit 12. In this context, in an exemplary embodiment, the drive unit 28 is understood to be the engine, clutch, and transmission, and the torque of the drive unit is the output torque at the wheel or at the transmission output.

By locating (or providing) a traction controller, and, if desired, additionally providing a transverse acceleration controller, in the control unit 12 for the drive unit 28, a simpler drive dynamics control system (for the driven case) for improving the vehicle stability (for the driven case) may be provided that operates reliably without much outlay of software and hardware. This applies especially when using the transverse acceleration control system of non-prepublished German Patent Application No. 198 49 912.7, as previously discussed, and the traction control system described here as follows. Relatively complex hardware and/or software measures in the at least one microcomputer of the control unit 10 for controlling the braking system are not believed to be necessary, when implementing such a control system to influence the driving power of the drive unit 28, so that the control unit 10 can be reduced (or simplified) to an anti-lock controller and/or a drive dynamics control system with braking intervention. Also, relatively complex measures for transmitting the at least one manipulated variable to the control unit 12 and/or relatively complex algorithms for determining the at least one manipulated variable may not be required.

In the exemplary embodiment, the at least one microcomputer of the control unit 12, influences the driving power or the drive torque of the vehicle as a function of the drive slip, and, possibly, the transverse acceleration of the vehicle. Depending on the particular design of the drive unit 28 and of the control unit 12, the driving power or the drive torque of the vehicle, in the case of an internal combustion engine, is produced by influencing the air supply (through the throttle valve), the fuel-injection quantity, and/or the ignition firing point. In addition, the transmission, in particular the transmission gear ratio, and a clutch capable of being actuated electrically may also be influenced. Independently of this, the wheel brakes can be influenced as a function of the mentioned signals in the control unit 10. In an exemplary embodiment, a signal, which is generated in one of the control units and transmitted to the other control unit, communicates the priority between braking and torque intervention in a traction control system. This priority determines whether a torque intervention or a braking intervention is carried out first in response to a tire slip condition. The driving torque or the driving power are limited, reduced, or increased as a function of the described quantities. Because of the implementation in the control unit 12 for the drive unit 28, very short actuating times may be achieved. By using characteristic maps when working with the traction controller, continuous intervention may be provided so that there is no separate triggering. It is believed that this measure may also considerably reduce the outlay with regard to software and hardware requirements.

An exemplary embodiment for a traction controller is described based on the flow charts of FIGS. 2, 3, 4a and 4b.

Figure 2:
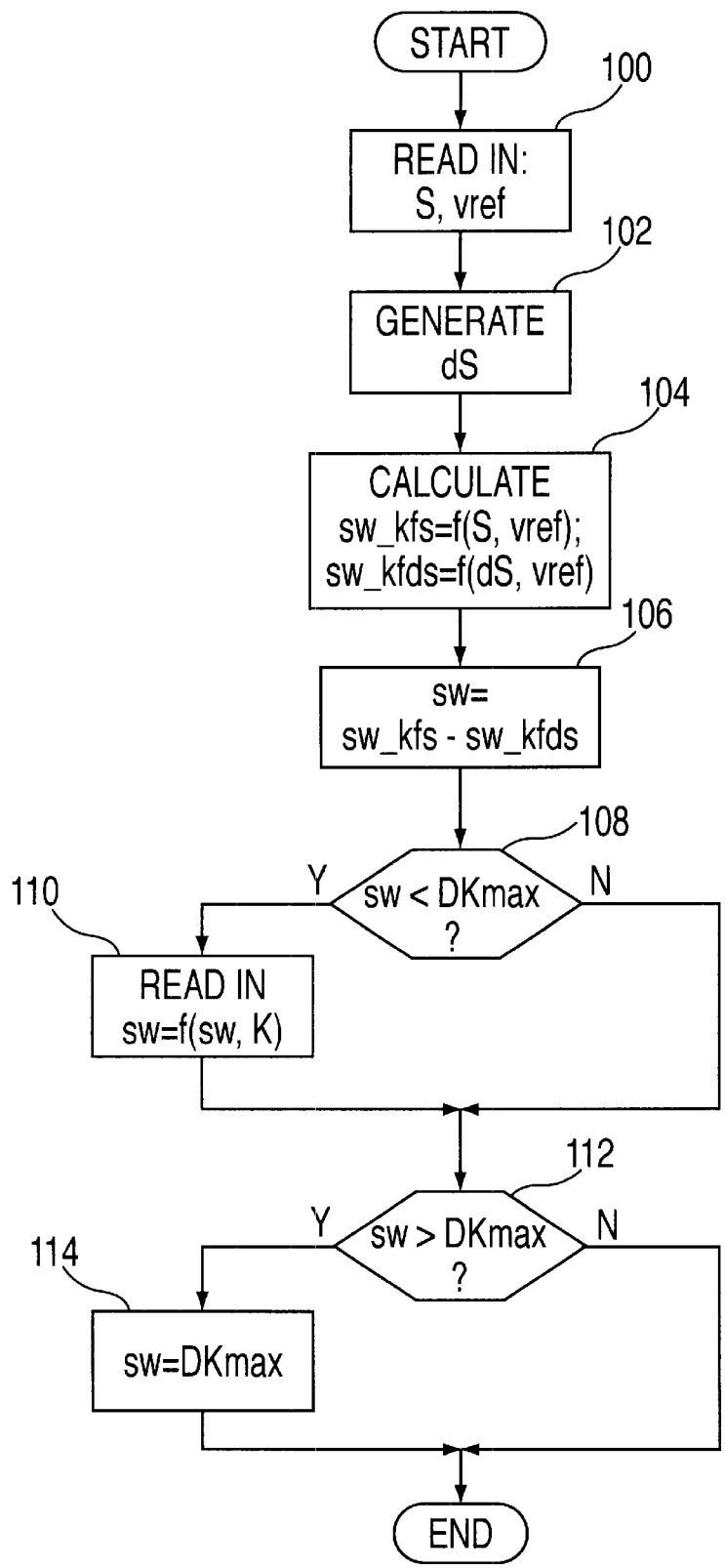
FIG. 2 shows a first flowchart for a traction control method, in which an exemplary embodiment is executed in the control unit of the drive unit. The flow chart shows a method that may be implemented by computing elements of the control unit for controlling the drive unit.

The method or program shown in FIG. 2 is performed at predefined instants. In a first step 100, a slip S of at least one drive wheel and a vehicular reference velocity vref or the vehicular velocity are read in. For example, the vehicular reference velocity may be generated from the mean speed signal of the non-driven wheels, while the slip signal may be generated, for example, from the difference of a selected speed of a non-driven wheel and a selected speed of a driven wheel, particularly from the respective maximum values. In other exemplary embodiments, other ways of calculating the slippage and the vehicular reference velocity may be used. The traction control system according to one exemplary embodiment of the present invention, described in the following, is independent of the specific way that the slip signal and the reference signal are determined.

In subsequent step 102, a time gradient dS of the slip signal is generated, for example, by subtracting two slip signal values that are detected at different instants. In step 104, two setpoint value portions sw_kfs and sw_kfds, which represent the portions of the setpoint value for the manipulated variable influencing the engine torque or the engine power (which in the exemplary embodiment is the throttle-valve angle) are generated based on two characteristic maps as a function of the slippage S and the reference velocity signal vref or based on the slip gradient dS and the reference velocity signal vref. In step 106, the two setpoint values are combined into a setpoint value sw. In the exemplary embodiment, the setpoint value, which is calculated based on the gradient of the slip signal, is subtracted from the setpoint value, which is determined based on the slip signal. In other exemplary embodiments, a minimum value selection or an addition of both values may be performed. If setpoint value sw, as determined in step 106, is smaller than a preset maximum value setpoint value Dkmax, then, in response to a corresponding determination in step 108, in step 110, at least one correction factor K is read in and the setpoint value sw is corrected based on correction factor K. In this context, the correction factor K is considered multiplicatively in the exemplary embodiment. It is read in only if the setpoint value is smaller than the maximum setpoint value, and an intervention of the traction controller is present. The correction factor allows for additional tractive resistances, such as the grade of the road, and/or the altitude above sea level. The correction factor is generated, for example, as a function of the acceleration and the velocity of the vehicle and/or based on an external pressure measurement. Subsequent to step 110 or in the case of a "no"-answer in step 108, it is checked in step 112 whether the possibly corrected setpoint value sw exceeds a maximum value DKmax. If this is the case, then the setpoint value is kept at the maximum value Dkmax according to step 114, otherwise, just as subsequent to 114, the program is terminated and restarted at the next instant.

In another exemplary embodiment, characteristic maps may be used for the slip signal and the actual value of the throttle-valve position, as well as for the gradient of the slip signal and the actual value of the throttle-valve position, which are combined into the setpoint value in a corresponding manner as shown in FIG. 2.

In the exemplary embodiment, the determined setpoint value limits the throttle-valve angle as long as the throttle-valve angle selected by the driver is greater. Therefore, the setpoint value is also designated as a limiting value. This also similarly applies for use in conjunction with a diesel gasoline engine, for which there is a preset setpoint value for the fuel quantity.

In step 100, the slip signal, which is read in, is suitably conditioned and filtered. In another exemplary embodiment, the slip signal may be weighted via a cornering signal, the velocity signal, the vehicle acceleration signal, the grade of the roadway, and/or the wheel acceleration. In this context, the weighting factors may be stored in characteristic curves and considered using at least one arithmetic operation (e.g., multiplication) with the slip-signal value.

Figure 3:
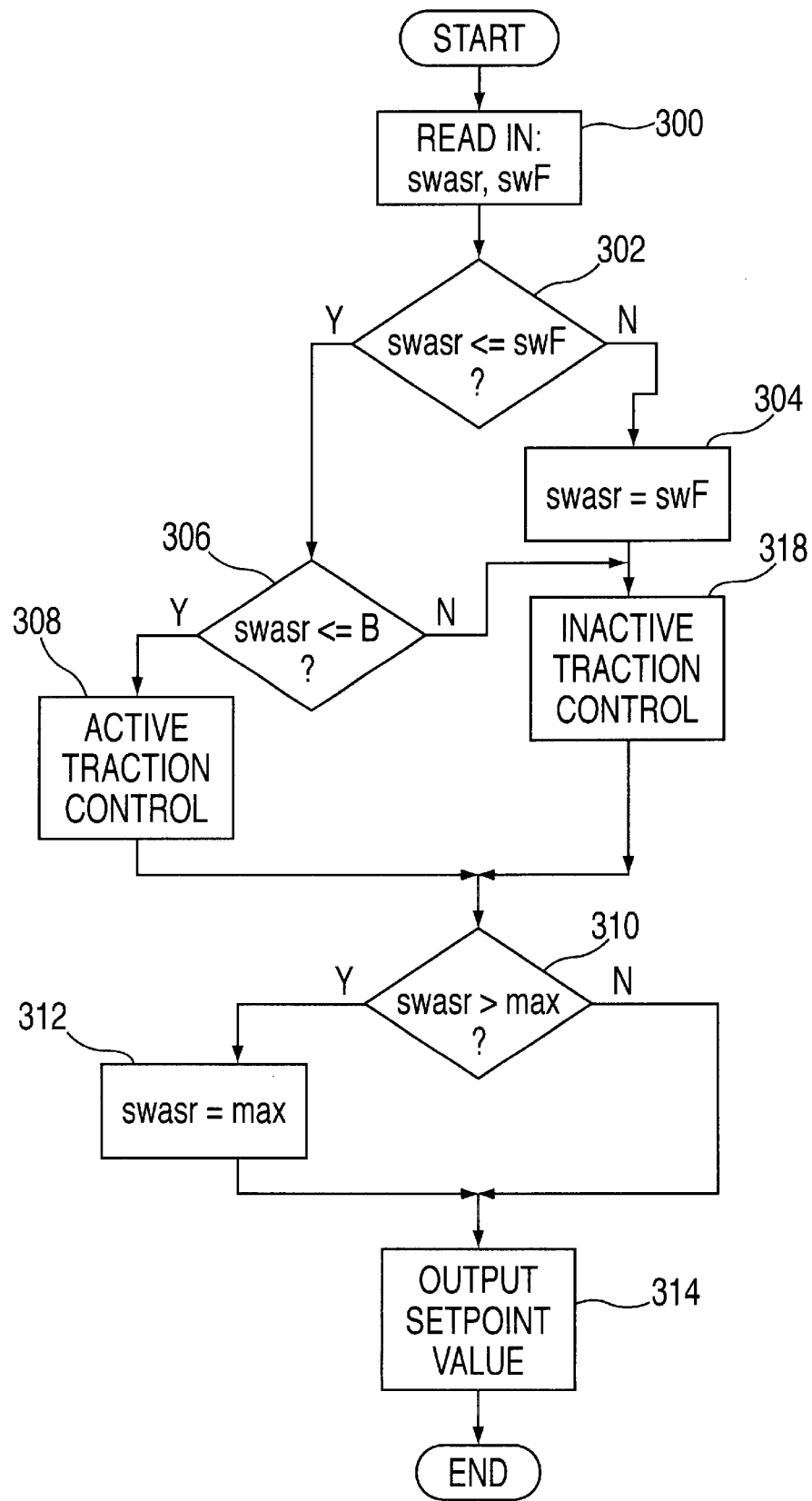
FIG. 3 shows a second flowchart for a traction control method, in which an exemplary embodiment is executed in the control unit of the drive unit. The flow chart shows a method that may be implemented by computing elements of the control unit for controlling the drive unit.

The calculation of the setpoint value to be output based on the calculated setpoint value sw is shown in FIG. 3. Subsequent to starting the subprogram at predefined instants, the currently output setpoint value swasr and the driver setpoint value swF are read in, in the first step. In subsequent step 302, it is checked whether the output setpoint value swasr is smaller than or equal to (or no larger than) the driver setpoint value swF. If this is the case, it is checked in step 306 whether the setpoint value swasr to be output is smaller than or equal to (or no larger than) a threshold value B (e.g., 60°). If this is the case, the traction controller is assumed to be active according to step 308, and a driver information lamp may be activated. In the case of a "no"-answer in step 306, the driver information lamp may be switched off (step 318). In step 310, the set setpoint value swasr to be output is compared to a maximum value max. If the setpoint value to be output is greater than the maximum value, it is set to the maximum value according to step 312. Subsequently, the setpoint value is output with the driver setpoint value (step 314) for minimum value selection (not shown), and the program is terminated. If, according to step 310, the setpoint value to be output is not greater than the maximum value. Then the setpoint value to be output is output without limitation.

If step 302 has revealed that the output setpoint value swasr is greater than the driver setpoint value swF, then the setpoint value swasr to be output is set to driver setpoint value swF (step 304), and the driver information lamp is switched off or remains switched off according to step 318. The program is continued in step 310.

Besides selecting a setpoint throttle valve angle within the framework of the traction control, an engine torque setpoint value may be selected in another exemplary embodiment. In still another exemplary embodiment, the throttle valve setpoint value may be corrected so that a comparable engine torque is adjusted for all engine operating points. In the process, the limiting angle or the setpoint value for the throttle-valve position may be weighted with the engine speed.

Besides intervening in the throttle valve for traction control, the boost pressure in the intake section of an internal combustion engine may be changed in another exemplary embodiment. This takes place preferably during the entire traction control cycle. In this manner, the power output of the internal combustion engine may be reduced during the entire traction control so that the throttle valve, and consequently the drive slip, may be controlled more precisely.

In addition to intervening in the throttle-valve position, there may be an intervention (action or measure) taken with respect to the ignition and/or a suppression of the injection, which also reduces the engine power output or the engine torque, and consequently the drive slip. In this context, the additional interventions are independent of the intervention in the throttle-valve position so that the additional interventions also considered in the progression of the change in the throttle-valve position via the feedback by the reduction of the slippage.

Furthermore, additionally or alternatively to the throttle intervention, it is possible, during high dynamic performance, to intervene in an electrically controllable clutch, in particular in the starting range or while shifting gears. A transmission intervention may be performed in an exemplary embodiment, in which the transmission may be shifted to the next higher gear so as to achieve more precise control of the throttle valve with smaller torque changes. The next higher gear is abandoned again when the traction-control intervention is completed.

For a diesel engine, the injection quantity may be adjusted instead of the throttle-valve position. For an electromotor, the engine torque or the power output of the electromotor may be reduced in a corresponding manner.

For internal combustion engines having a turbocharger, the activity of the turbocharger may be a disturbance variable when the traction control acts upon the engine torque via the throttle valve setpoint angle. For such an internal combustion engine, it is believed that it is therefore advantageous to adjust an induction pipe setpoint pressure value instead of the throttle-valve setpoint value to minimize this disturbance variable.

FIG. 2 shows the generation of the setpoint value based on the slippage and the change in slippage. This setpoint value results in a limiting of the setpoint value for the manipulated variable reducing the engine torque. If this limiting value increases in response to the change in slippage again, an increased limiting value for the setpoint value becomes active, which approximates the setpoint value to the driver value or to the limiting value as described in the following (namely the adding routine or ramp-up function). An exemplary embodiment of this method is shown in the flow charts of FIGS. 4A and 4B. This program is also started at predefined instants when the setpoint value, which is calculated according to the methods of FIGS. 2 and 3, increases again.

Figure 4A:
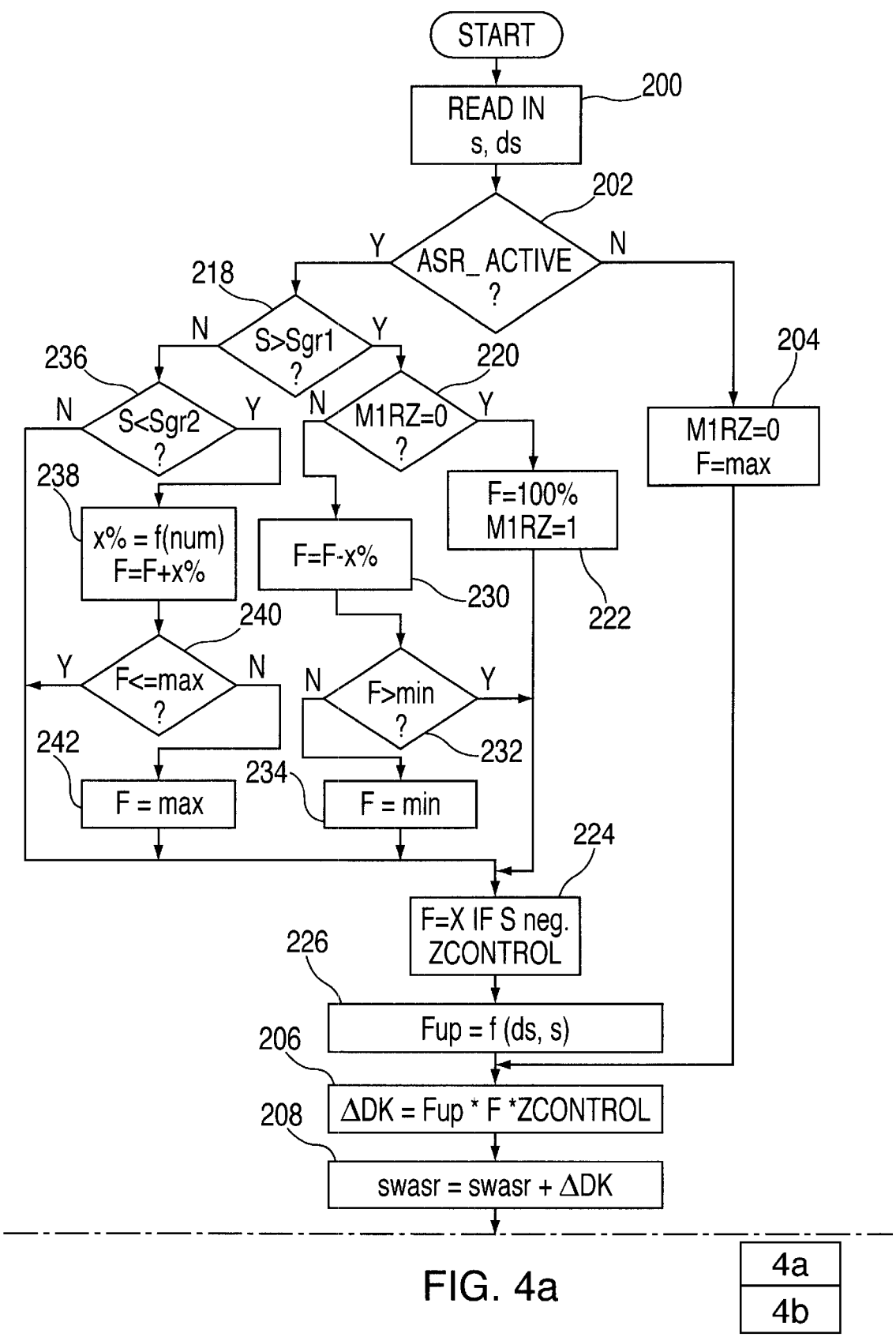
FIG. 4a shows a third flowchart for a traction-control method, in which an exemplary embodiment is executed in the control unit of the drive unit. The flow chart shows a method that may be implemented by computing elements of the control unit for controlling the drive unit.

Subsequent to the start of the subprogram in FIG. 4a, the slippage S and the slip gradient dS are read in, in first step 200. In subsequent step 202, it is determined whether the traction control is active. This is performed, for example, based on a flag (label) ASR_active, which is set in response to the appearance of tire slip or the necessity of reducing the torque. If the traction control is not active, flag (label) M1RZ (which indicates the first control cycle) is reset (such as to a zero value), and a factor F (which influences the gradient of the ramping up) is set to its maximum value max (step 204). In next step 206, an adding value ΔDK for the manipulated variable (the adding value increases the setpoint value for achieving the increase limiting) is generated, preferably by multiplication, based on the ramp-up factor Fup (which is ascertained as described in the following), factor F and a value Zcontrol that indicates the number of control cycles. In a next step 208, the setpoint value swasr to be output is increased by the adding value ΔDK.

Subsequently, the setpoint value swasr to be output is compared to a driver input DKF in step 210. If the setpoint value to be output is greater than the driver input, the traction control is assumed to be no longer active, and the corresponding flag (label) ASR_active is reset (step 212). Subsequent to step 212, or to step 210 in the case of a "no"-answer, the setpoint value to be output is compared to a maximum value in step 214. If the setpoint value exceeds the maximum value, then the setpoint value is limited to the maximum value (step 216). After that or subsequent to step 214 in the case of a "no"-answer, the program is terminated and repeated at the next instant.

If flag (label) ASR_active is set, the factors, which may be used to calculate the adding value ΔDK, are determined. Initially, the slippage S of the at least one drive wheel is compared to a limiting value Sgr1 in step 218. If the slippage exceeds this limiting value, it is determined in step 220 whether the flag (label) for the first control cycle M1RZ is set. If not, the factor F is set to its maximum value (e.g., to 100%), and flag (label) M1RZ is set (e.g., to 1) in step 222. In the case of negative slippage, the factor F is set to a preset value X in step 224, and in a following step 226, the ramp-up factor Fup is calculated according to a characteristic map based on the slippage S and the slip gradient dS. In an exemplary embodiment, a factor Zcontrol may also read out from a characteristic curve in step 224 as a function of the number of previous control cycles, and it is continued in step 206 and the calculation of the adding value ΔDK is continued.

Depending on the practical embodiment, step 224 may be optional. In the exemplary embodiments, however, it contributes to further improved traction control.

If step 220 reveals that flag (label) M1RZ is set (control in first cycle), then the factor F is reduced by a preset value Δ (e.g., x%) according to step 230. In one exemplary embodiment, an interrogation 220 may be omitted. Subsequently, the factor is compared to a minimum value in step 232, and, if it is less than the minimum value, reduced to the minimum value in step 234. This procedure results in a dependence of the gradient of the manipulated variable (or regulated quantity) on the duration during which the tire slip exceeds the limiting value. In this context, the longer the tire slip exceeds the limiting value, the flatter is the gradient.

If, according to step 218, the tire slip S is not greater than the limiting value, it is determined in step 236, whether the tire slip is less than a second limiting value Sgr2, which is derived from the limiting value of step 218. If the tire slip is not less than this limiting value, the factor F remains uninfluenced, and it is continued in step 224. If the tire slip is below the second limiting value, the factor F is increased by a preset value Δ2 (e.g., x%). This value can be identical to the value of step 230. In this case, a re-increase, which is slower compared to the lowering of factor F, is achieved since step 238 is run through in a greater time pattern than step 230. In an exemplary embodiment, the value x% is changed (increased) after a specific number (num) of runs of this step (step 238) so that a progressive addition of the manipulated variable results. In another exemplary embodiment, a value Δ2 is considerably smaller than the value Δ from step 230. In steps 240 and 242, a maximum limiting of factor F is carried out, and it is subsequently continued in step 224.

Figure 4B:
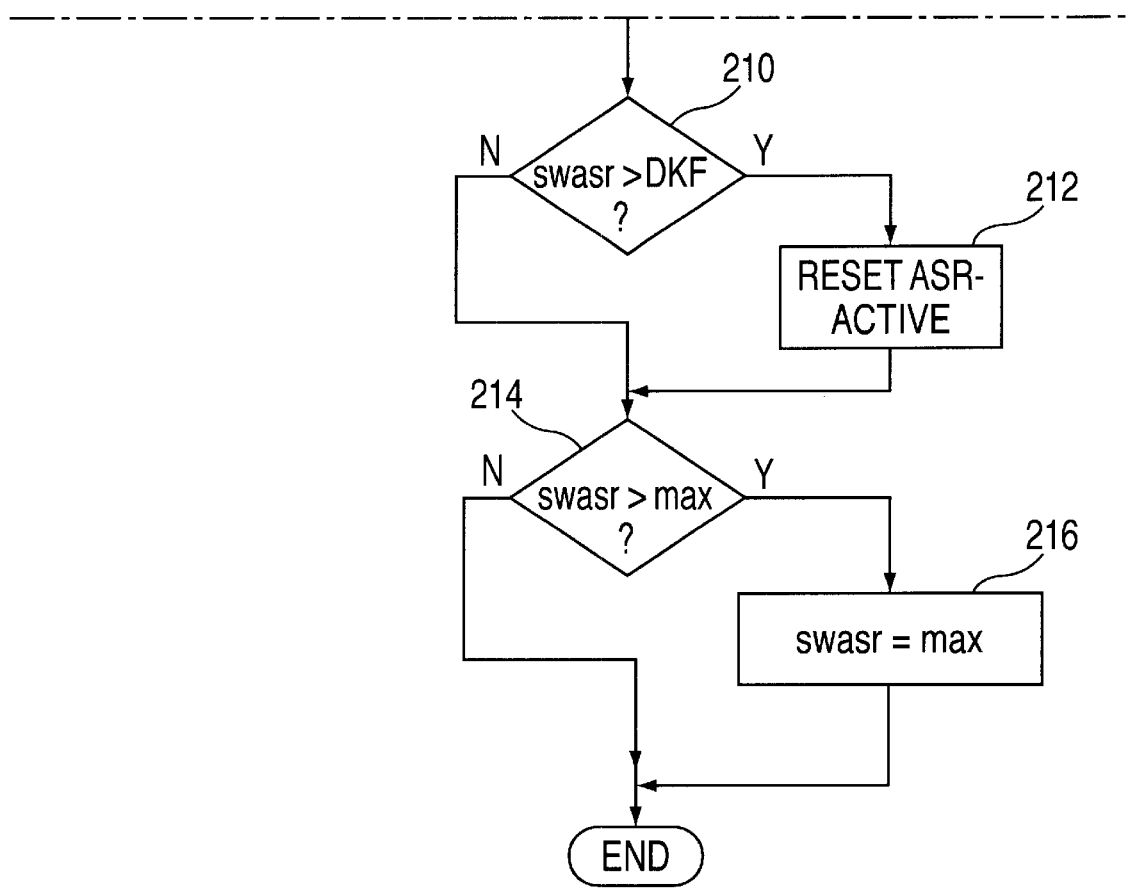
FIG. 4b shows a fourth flowchart for a traction control method, in which an exemplary embodiment is executed in the control unit of the drive unit. The flow chart shows a method that may be implemented by computing elements of the control unit for controlling the drive unit.

Therefore, FIGS. 4a and 4b show an increased limiting of the setpoint value of the manipulated variable, and consequently of the manipulated variable or the parameter influenced by the manipulated variable themselves, the gradient depending on the slip characteristic (i.e., in particular on the change in slippage and the slip magnitude).

In another exemplary embodiment, the increased gradient is not generated from a characteristic map of the slippage and the slip gradient, but from a characteristic map using the slippage and an actual manipulated variable.

Besides weighting the increase gradient using the slip magnitude, a weighting may be performed additionally or alternatively using the number of control cycles of the traction control. This signifies that, depending on the duration of any unacceptable slippage, the gradient of the adding routine of the manipulated variable changes, particularly in the direction that the gradient is reduced with an increasing number of control cycles. In an exemplary embodiment, the increase gradient becomes zero when the setpoint value preset by the driver is smaller than the setpoint value generated by the traction controller for the manipulated variable.

Figure 5A:
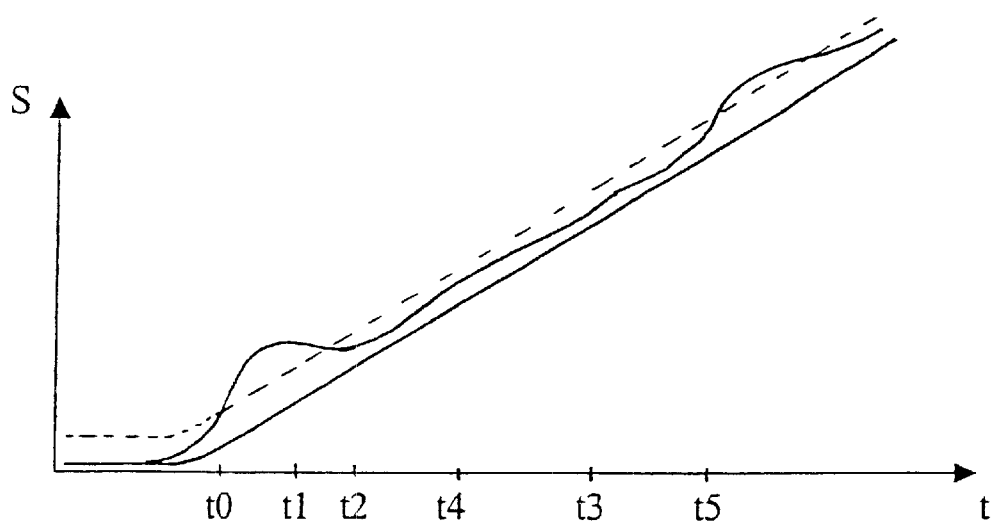
FIG. 5a shows a first timing diagram that concerns the method and system of an exemplary embodiment of the present invention.
Figure 5B:
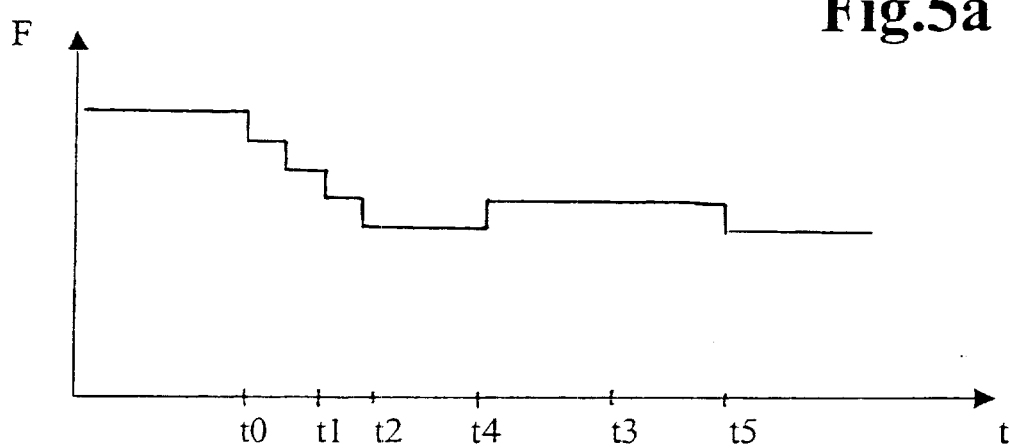
FIG. 5b shows a second timing diagram that concerns the method and system of an exemplary embodiment of the present invention.
Figure 5C:
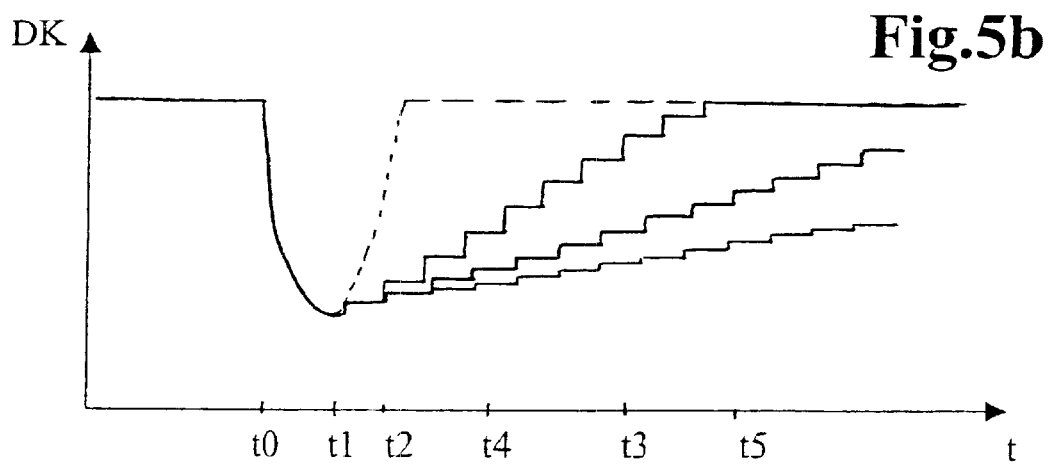
FIG. 5c shows a third timing diagram that concerns the method and system of an exemplary embodiment of the present invention.

FIGS. 5a, 5b, and 5c show timing diagrams that concern the method and procedure described above. FIG. 5a shows the time characteristic of the tire slip S based on a selected wheel. FIG. 5b shows the time characteristic of the factor F. FIG. 5c shows the time characteristic of the setpoint value of the manipulated variable or of the parameter DK that is influenced by the manipulated variable.

In FIG. 5a, a variable VFZ, which is approximated to the vehicular velocity, is drawn in as a "lower" line. The characteristic of the limiting value Sgr1 is shown as a dashed line, and the characteristic of the selected wheel speed Vwheel is shown as a "wavy" solid line. At instant t0, the wheel speed exceeds the limiting value, and the first control cycle begins. The factor F is reduced in predefined steps correspondingly as shown in FIG. 5b. When the first control cycle begins, the manipulated variable is reduced as a function of the tire slip and the slip gradient (see steps 104 and 106, and the solid line in FIG. 5c). The characteristic of the manipulated variable is subsequently shown as a dashed line, since the above described increase limiting is acting during the re-increase. The adding value ΔDK is generated from instant t1 on according to step 206. Subsequently, the manipulated variable is increased by steps until the maximum value is reached at instant t3. In this context, the gradient depends on the duration during which the wheel speed exceeds the limiting value during the first cycle, or on the slip integral. If the slippage is high (see the dashed line), the gradient is flat. If the slippage is small, the gradient is high (see the solid line). If the slippage is in a medium range, then the gradient is also in the medium range (see the middle line).

At instant t2, the wheel speed falls below the second limiting value. The factor F is kept at the last value, and the first cycle is completed. The wheel speed remains under the second limiting value until t5. Therefore, the factor F is slowly increased again (see t4). At instant t5, the first limiting value is exceeded again so that the factor is reduced anew. For clarity purposes, the effect of this new "exceeding" is not shown in FIG. 5c.

In an exemplary embodiment, the gradient may be changed not only in the first but in all control cycles.

The dependence of the "gradient of the addition" may be used with the assistance of a characteristic map independently of the specific location where the traction controller is implemented or the manner in which the setpoint value is determined.

What is claimed is:

1. A control system for influencing at least one quantity representing a tire slip in a vehicle, the control system comprising:

a control unit including a traction controller for influencing one of a power output and a torque of a drive unit of the vehicle as a function of a wheel-speed performance;

wherein one of the power output and the torque is influenced as a function of a setpoint value for a manipulated variable influencing one of the power output and the torque, the setpoint value being ascertained on the basis of at least one characteristic map that depends on a slippage of at least one wheel of the vehicle and a slip gradient of the slippage.

2. The control system of claim 1, wherein the control unit includes a control function for influencing a transverse acceleration of the vehicle by intervening in the at least one of the power output and the torque of the drive unit.

3. The control system of claim 1, further comprising:

a communication connection for coupling the control unit and a second control unit, wherein the communication connection transmits data for a traction control with respect to a wheel-speed performance and a velocity of the vehicle from the second control unit to the control unit.

4. The control system of claim 1 wherein the setpoint value for the manipulated variable is generated based on at least one of a sum and a difference of at least two characteristic-map values of the at least one characteristic map.

5. The control system of claim 1, wherein another characteristic map generates the setpoint value as a function of a reference vehicle velocity and one of the slip gradient and the slippage.

6. The control system of claim 1, wherein the setpoint value for the manipulated variable is generated based on at least two characteristic-map values.

7. The control system of claim 6, wherein the setpoint value for the manipulated variable is generated based on one of a subtraction and an addition of the at least two characteristic-map values.

8. The control system of claim 1, wherein an increase gradient of the setpoint value for the manipulated variable, by which the manipulated variable approximates a preset value when the traction controller is not controlling a traction, is determined based on another characteristic map as a function of at least one of the slippage and the slip gradient.

9. The control system of claim 1, wherein the setpoint value is correctable based on at least one correction factor.

10. The control system of claim 9, wherein the at least one correction factor is at least one of a road grade and an altitude.

11. The control system of claim 1, wherein the setpoint value is a setpoint angle of a throttle valve.

12. The control system of claim 1, wherein the control system is adapted to intervene in at least one of an ignition operation, a fuel injection operation, an electrically controllable clutch operation and an automatic transmission ratio change operation.

13. The control system of claim 12, wherein a signal that determines a priority of having the control system intervene is transmittable to the control unit.

14. A control system for influencing at least one quantity representing a tire slip in a vehicle, the control system comprising:

a control unit including a traction controller for influencing one of a power output and a torque of a drive unit of the vehicle as a function of a wheel-speed performance;

wherein:
an increase limiting of a manipulated variable for the torque of the drive unit is generated in response to a change in the manipulated variable corresponding to an increase in the torque, and
a gradient of the manipulated variable depends on one of a magnitude of a slip integral and on a duration during which a wheel speed exceeds a limiting value.

15. The control system of claim 14, wherein the gradient of the manipulated variable depends on the slip integral, the slip integral being an integral of slip over a first control cycle.

16. The control system according to claim 14, further comprising:
a second control unit for influencing a braking force of at least one wheel brake of the vehicle.

17. A control system for influencing at least one quantity representing a tire slip in a vehicle, the control system comprising:
a control unit including a traction controller for influencing one of a power output and a torque of a drive unit of the vehicle as a function of a wheel-speed performance;
wherein:
an increase limiting of a manipulated variable for the torque of the drive unit is generated in response to a change in the manipulated variable corresponding to an increase in the torque,
a gradient of the manipulated variable depends on one of a magnitude of a slip integral and on a duration during which a wheel speed exceeds a limiting value, and
wherein a smaller gradient of the manipulated variable corresponds to a greater slip integral.

* * * * *